US008383185B2

(12) United States Patent
Diks et al.

(10) Patent No.: US 8,383,185 B2
(45) Date of Patent: Feb. 26, 2013

(54) SHELF STABLE HOMOGENEOUS SUSPENSION

(75) Inventors: Robertus Martinus M Diks, Vlaardingen (NL); Ian Stewart Galloway, Vlaardingen (NL); Michel Mellema, Vlaardingen (NL); Helena Kristina Persson, Helsingborg (SE)

(73) Assignee: Conopco, Inc., Englewood Cliffs, NJ (US)

( * ) Notice: Subject to any disclaimer, the term of this patent is extended or adjusted under 35 U.S.C. 154(b) by 666 days.

(21) Appl. No.: 10/581,380

(22) PCT Filed: Nov. 10, 2004

(86) PCT No.: PCT/EP2004/012755
§ 371 (c)(1),
(2), (4) Date: Jun. 1, 2006

(87) PCT Pub. No.: WO2005/053414
PCT Pub. Date: Jun. 16, 2005

(65) Prior Publication Data
US 2007/0110876 A1 May 17, 2007

(30) Foreign Application Priority Data
Dec. 4, 2003 (EP) .................................... 03257647

(51) Int. Cl.
*A23D 7/00* (2006.01)
(52) U.S. Cl. ......... 426/602; 426/654; 426/573; 426/570
(58) Field of Classification Search .................. 426/602, 426/33, 40, 531, 601, 654, 573, 570
See application file for complete search history.

(56) References Cited

U.S. PATENT DOCUMENTS

| | | | | |
|---|---|---|---|---|
| 3,917,859 A | * | 11/1975 | Terada et al. | 426/602 |
| 4,305,970 A | * | 12/1981 | Moran et al. | 426/603 |
| 4,421,778 A | * | 12/1983 | Kahn et al. | 426/564 |
| 4,748,028 A | * | 5/1988 | McKenna et al. | 426/130 |
| 4,853,243 A | * | 8/1989 | Kahn et al. | 426/564 |
| 4,888,194 A | * | 12/1989 | Andersen et al. | 426/570 |
| 4,917,915 A | * | 4/1990 | Cain et al. | 426/573 |
| 5,063,074 A | | 11/1991 | Kahn et al. | |
| 5,077,077 A | * | 12/1991 | Suzuki et al. | 426/602 |
| 5,332,595 A | * | 7/1994 | Gaonkar | 426/602 |
| 5,609,904 A | * | 3/1997 | Koh et al. | 426/565 |
| 6,045,853 A | * | 4/2000 | Reddy | 426/603 |
| 6,060,105 A | * | 5/2000 | Meister et al. | 426/580 |
| 6,146,672 A | * | 11/2000 | Gonzalez et al. | 426/94 |
| 6,326,050 B1 | * | 12/2001 | Goto et al. | 426/601 |
| 6,468,576 B1 | * | 10/2002 | Sher et al. | 426/565 |
| 6,764,707 B1 | * | 7/2004 | Masui et al. | 426/601 |
| 2003/0054082 A1 | * | 3/2003 | Koike et al. | 426/601 |

FOREIGN PATENT DOCUMENTS

| | | |
|---|---|---|
| EP | 0389177 | 9/1990 |
| EP | 1197153 | 4/2002 |
| EP | 1059851 | 5/2002 |
| GB | 2360438 | 9/2001 |
| WO | 99/39586 | 8/1999 |
| WO | 00/64267 | 2/2000 |
| WO | 02/065859 | 8/2002 |
| WO | WO 02/065859 | * 8/2002 |

OTHER PUBLICATIONS

"Dairy Consultant, Milk Pasteurization basics", Nov 21, 2002.*
S. P. Kochhara, "Influence of Processing on Sterols of Edible Vegetable Oils", 1983, p. 162.*
List of Foods (with High Phytosterol) That Help Lower Serum Cholesterol.*
TheInfluenceofRawandSterilizedMilkNPL,1936.*
Technology of dairy products NPL, 1992.*
European Search Report Application No. 03257647.2-2114—dated Apr. 4, 2001.
Schwartzel et al., "Rheological Behavior of Ultra-High Temperature Steam Injected Dairy Products on Aging", Dept. of Food Science, North Carolina State University, Raleigh, NC, 1980, pp. 143-159.
Kochhar, "Influence of Processing on Sterols of Edible Vegetable Oils", Prog. Lipid Res., vol. 22, pp. 161-188, 1983.
Pelan et al., 1997, The Stability of Aerated Milk Protein Emulsions in the Presence of Small Molecule Surfactants, J Dairy Sci, 80, 2631-2638.
Australian Office Action dated Mar. 15, 2007.

* cited by examiner

*Primary Examiner* — Drew Becker
*Assistant Examiner* — Preston Smith
(74) *Attorney, Agent, or Firm* — Gerard J. McGowan, Jr.

(57) ABSTRACT

Protein-containing suspensions such as milk that are preserved by a UHT treatment, show age gelation. This age gelation can be reduced by inclusion of an emulsifier with an HLB value below 16.

13 Claims, No Drawings

SHELF STABLE HOMOGENEOUS SUSPENSION

FIELD OF THE INVENTION

The invention relates to shelf stable homogeneous suspensions, especially milk drinks.

BACKGROUND ART

Sterilization such as by ultra high temperature treatment of milk and other protein containing suspensions creates a product which is microbially stable at room temperature for several months. This preservation technique is especially :used for drinks such as milk.

In general, a sterilization such as an Ultra High Temperature (UHT) treatment, raises the temperature of milk to-over 110° C., or even over 125° C. for a few seconds, followed by rapid cooling. UHT-treated milk that is packaged aseptically results in a "shelf stable" product that does not require refrigeration until opened.

Although such products may be microbiologically stable for a long time, there may be some defects which limit the useful shelf life of these products. One of such defects that have been discussed extensively in the art is UHT gelation (also referred to as age thickening). This defect is specifically observed for UHT treated products or otherwise sterilized products that are heat treated and is not observed for products that have not undergone such high temperature heat treatments. For example products that are only pasteurised do not show this defect.

UHT gelation is an aggregation phenomenon that affects shelf-stable, sterilized protein containing products, such as concentrated milk and UHT milk products and other dairy products. UHT gelation may be linked partly to age thickening or age gelation. After weeks to months storage of these products, there is an increase in viscosity accompanied by visible gelation.

In the context of this invention, gelation describes the phenomenon of increase of viscosity and/or elasticity of the product. Gelation is generally linked to the formation of a space-spanning network and therein differs from other phenomena such as sedimentation which is more about a spatial redistribution of ingredients. An example of sedimentation is the heaviest ingredients in a product sinking to the bottom of the packaging.

In the above definition of gelation we do not exclude the possibility of the space spanning network to redistribute after it has formed a space spanning network, i.e. the gel may be subject to syneresis, thereby pushing out some of the liquid trapped by the network. Upon ageing within the maximum shelf life of the UHT product (typically 4 months), the network may have shrunk to a fraction of its original size (>75%), while retaining its elastic properties. Upon severe ageing, which only occurs beyond the maximum shelf life of the UHT product, the network may have shrunk to an even smaller fraction of its original size (>25%).

Note that the ageing process of a product suffering from sedimentation is different from above definition; sedimentation is accompanied by the growth of a layer of ingredients at the bottom of the product. The product does not pass a stage of spanning the whole space. Also, it is well known in the art to use gelling ingredients like κ-carrageenan in liquid UHT products to protect them against sedimentation (usually resulting from heat coagulation). Hence, gelation typically reduces the rate of sedimentation.

In the process of UHT or age gelation, the formation of a space-spanning network may be caused by aggregation of proteins leading to formation of a three-dimensional network. The exact mechanism underlying UHT and/or age gelation is not yet fully understood but it was found that it may be at least partially caused by the proteolytic breakdown of proteins such as the casein in dairy products. It has been described in the art that bacterial or native plasmin enzymes that are resistant to heat treatment may induce the formation of a gel. Another factor that is often cited in relation to UHT and/or age gelation is temperature of storage of the sterilized suspension. Also chemical reactions may be responsible for UHT/age gelation.

WO-A-00/64267 discloses that the major problem for shelf stable milk is age gelation. This document suggests that use of food-grade polyphosphates having at least six phophate groups, such as sodium hexametaphosphate in calcium-fortified milk and dairy-based products prevents age gelation of UHT treated milk.

Although the above-cited documents may offer some improvement to the stability of UHT treated products, further improvement and alternatives thereto are desired.

Furthermore there are documents addressing the sedimentation-stability and precipitation reduction in suspensions. E.g. EP-A-1,197,153 and WO-A-02/065859 address the reduction of precipitation in emulsions or suspensions. These documents do not disclose UHT treated products and the problems related thereto. Also these documents do not provide a solution for the problem of UHT gelation.

The stability of homogeneous suspensions is also addressed in EP-A-1059851. This document teaches that a stable suspension can be made without emulsifiers by the inclusion of a thickener. When these products are UHT treated, they will still show UHT gelation.

Therefore it is an object of the invention to provide a shelf stable sterilized protein containing suspension which uses alternative means of stabilisation.

SUMMARY OF THE INVENTION

We have surprisingly found that the addition of a small amount of emulsifier reduces the gelation of sterilized protein containing suspensions.

Therefore the invention relates to a sterilized aqueous suspension comprising protein and fat or a fat replacer and from 0.01 wt % to 1 wt % emulsifier with a hydrophylic/lypophylic balance of at or below 16.

In a further aspect the invention relates to use of an emulsifier to reduce age gelation in sterilized protein containing suspensions, especially UHT treated milks.

DETAILED DESCRIPTION

In the context of the invention milk is preferably of dairy origin but the term milk also encompasses reconstituted dairy and non dairy milk and melanges, whereby the origin of protein, fat and other ingredients may be dairy, vegetable, marine or a combination thereof.

Where weight percentages are used they are based on total product weight unless otherwise is indicated.

In the context of the invention sterilization may be achieved by any suitable method such as Ultra High Temperature treatment (UHT), or long time high temperature treatment such as 30 minutes at a temperature of around 110° C. In the context of the invention, the term sterilization also covers extended shelf life treatments which use temperatures over 110° C. The preferred method of sterilization is UHT treatment. In the context of the invention, sterilization is defined as the heat treatment aimed at killing micro-organisms, including bacterial spores. Preferred sterilization treatments are e.g. 30 min at 130 degrees C., or 1 s at 145 degrees C. To estimate the minimal heat treatment necessary to achieve sterilisation, a factor f0 is commonly used, which is a measure of the total heat load that the product has seen. It is commonly accepted that an f0 of 3 is the minimum heat load necessary to kill the most heat resistant bacteria. As an example: at 121 degrees C., an F0 of 3 means a heating time of 3 minutes.

In the context of the invention, UHT treatment is defined as treatment at a temperature of over 120° C.

The products according to the invention are suspensions comprising a protein. Without wishing to be bound by any theory, it is believed that the protein is at least partly responsible for the phenomenon of gelation in UHT treated suspensions.

The aqueous suspension preferably comprises from 0.5 to 10 wt %, more preferred from 1 to 5 wt %, even more preferred from 2 to 4 wt % protein. It will be appreciated that the level of protein is among others determined by the physical characteristics of the product in which it is applied. More viscous products generally comprise a higher protein level.

The products according to the invention preferably have a viscosity of from 2 to 100 mPa·s at a temperature of between 5 and 25° C. and a shear rate of 100 Hz.

More preferred the products have a viscosity of less than 50 mPa·s at a shear rate of 100 HZ at a temperature around 20° C.

The gelation effect is generally determined by eye. It is seen as a rather thick appearance of the composition which is especially noticeable on pouring the product. Shaking will remove most of the gelation effect and therefore the gelation is determined before shaking the product.

It is generally observed that gelation leads to an increase in viscosity of about 8 mPa·s, or alternatively, an increase of over 50% in the viscosity of the product under the same conditions of temperature and shear. Gelation is for example described in Schwartzel et al, 1980, Rheological behaviour of UHT steam injected dairy products on aging, Journal of Food process Engineering 3, p 143-159. A method to determine gelation is also described in Walstra et al, "Dairy Technology; principles of milk properties and processess" Marcel Dekker Inc, New York, Basel ISBN 0-8247-0288-X, 1999 (first edition).

The protein may be of any origin such as vegetable origin, e.g. soy protein, or dairy protein.

Preferably the protein is a dairy protein because this is the protein imparting the desired taste, flavour and texture to milk.

The suspensions are stabilised by the addition of emulsifier. The emulsifier is an emulsifier which has a hydrophylic lypophylic balance value (HLB value) of at or below 16. The HLB value is a parameter which is describing the solubility of the surfactant. The HLB value is a concept introduced by Griffin in 1950 as a measure of the hydrophilicity or lipophilicity of nonionic surfactants. It can be determined experimentally by the phenol titration method of Marszall; see "Parfumerie, Kosmetik", Vol. 60, 1979, pp. 444-448; and Rompp, Chemistry Lexicon, 8th Edition 1983, p. 1750. According to the invention, emulsifiers with an HLB value at or below 16 are to be understood as hydrophobic emulsifiers.

It has been found that emulsifiers with an HLB over 16, do not lead to the desired stabilization against age gelation. Optionally such emulsifiers with HLB values of more than 16 may be present in addition to the emulsifiers with HLB values at or below 16.

Preferably the emulsifier has an HLB value of below 14, more preferred from 1 to 10, more preferred from 2 to 9, most preferred from 3 to 6.

We have found that emulsifiers with HLB of at or below 14 are most effective in reducing UHT and/or age gelation. This effect may be strengthened by the presence of another effective agent such as polyphosphate. Therefore in an alternative embodiment the product comprises an emulsifier with HLB of more than 14 but at or below 16, in combination with a polyphosphate.

The emulsifier is preferably selected from the group comprising monoglycerides, lecithins, diglycerides, diacetyl tartaric acid esters of mono-and diglycerides, sucrose esters of fatty acids, sodium steoroyl lactylate (SSL), citric acid esters of mono- and diglycerides, or a combination thereof. Preferred emulsifiers are monoglycerides, lecithins, diglycerides and combinations thereof. The most preferred emulsifier is monoglyceride, especially saturated monoglyceride. Examples of such emulsifiers are Hymono™ 8903 and Dimodan™ hp.

In the context of the invention proteins are not included in the term emulsifier.

The amount of emulsifier is dependent on the type of emulsifier selected and the relative amount of protein present, but generally the level of emulsifier is from 0.01 to 1 wt %, more preferred from 0.05 to 0.5 wt %, even more preferred from 0.05 to 0.2 wt %. It will be appreciated that for each emulsifier there is an optimal amount for its functioning.

In one embodiment, the preferred amount of monoglycerides, diglycerides and SSL is from 0.05 to 0.5 wt %.

In another embodiment, the preferred amount of sucrose ester of fatty acid is from 0.01 to 0.3 wt %.

In a preferred embodiment the total level of emulsifier, including the emulsifier that may be naturally present in the products, such as in milk, is from 0.05 to 1 wt %.

In an alternative embodiment, the emulsifier is a lecithin, wherein the total amount of lecitin, including phospholipids naturally present in the product, is from 0.05 to 1 wt %, more preferred from 0.07 to 0.5 wt %.

In a most preferred embodiment, the emulsifier is a monoglyceride which is present in an amount of from 0.01 to 0.08 wt % on total product weight. This level includes the amount of monoglyceride which may be naturally present in the product such as milk wherein the average level of naturally present monoglyceride is generally around 0.004 wt %.

The aqueous suspension comprises fat or a fat replacer. The fat may be of any origin. It is preferred that the fat is dairy fat or a vegetable fat or a combination thereof.

In those embodiments where the fat is a vegetable fat, the fat is preferably selected from the group comprising sunflower oil, rapeseed oil, soy bean oil, olive oil, linseed oil or a combination thereof. The most preferred fats have a polyunsaturated fatty acid (PUFA) content of at least 30 wt % PUFA on total triglyceride composition.

The amount of fat is preferably from 0.1 to 8 wt %, more preferred from 1 to 5 wt %.

Optionally the products comprise a fat replacer. The fat replacer is preferably selected from the group comprising sucrose polyesters, phytosterols or esters thereof, including their saturated stanol equivalents or a combination thereof.

It has surprisingly been found that the addition of an emulsifier, especially monoglyceride in the described amount, to a suspension comprising fat and a phytosterolester increases the stability against UHT and/or age-gelation of these products to a surprisingly high level.

Most preferred the aqueous suspension comprises a fat and a phytosterol or ester thereof.

Phytosterols, also known as plant sterols or vegetable sterols can be classified in three groups, 4-desmethylsterols, 4-monomethylsterols and 4,4'-dimethylsterols. In oils they mainly exist as free sterols and sterol esters of fatty acids although sterol glucosides and acylated sterol glucosides are also present. There are three major phytosterols namely beta-sitosterol, stigmasterol and campesterol. Schematic drawings of the components meant are as given in "Influence of Processing on Sterols of Edible Vegetable Oils", S. P. Kochhar; Prog. Lipid Res. 22: pp. 161-188.

The respective 5α-saturated derivatives such as sitostanol, campestanol and ergostanol and their derivatives are also encompassed in the term phytosterol.

Preferably the phytosterol is selected from the group comprising β-sitosterol, β-sitostanol, campesterol, campestanol, stigmasterol, brassicasterol, brassicastanol or a mixture thereof.

The phytosterols in this preferred embodiment are preferably esterified with a fatty acid. Preferably the sterols are esterified with one or more $C_{2-22}$ fatty acids. For the purpose of the invention the term $C_{2-22}$ fatty acid refers to any molecule comprising a $C_{2-22}$ main chain and at least one acid group. Although not preferred within the present context the $C_{2-22}$ main chain may be partially substituted or side chains may be present. Preferably, however the $C_{2-22}$ fatty acids are linear molecules comprising one or two acid group(s) as end group(s). Most preferred are linear $C_{8-22}$ fatty acids as occur in natural oils.

Suitable examples of any such fatty acids are acetic acid, propionic acid, butyric acid, caproic acid, caprylic acid, capric acid. Other suitable acids are for example citric acid, lactic acid, oxalic acid and maleic acid. Most preferred are myristic acid, lauric acid, palmitic acid, stearic acid, arachidic acid, behenic acid, oleic acid, cetoleic acid, erucic acid, elaidic acid, linoleic acid and linolenic acid.

When desired a mixture of fatty acids may be used for esterification of the sterols. For example, it is possible to use a naturally occurring fat or oil as a source of the fatty acid and to carry out the esterification via an interesterification reaction.

Preferably the suspensions comprise a thickener. This thickener preferably contributes to the physical stability of the suspension. In a preferred embodiment the thickener is selected from the group comprising carrageenan, locust bean gum, xanthan, pectins, gum arabic, gelatin, guar gum, or a combination of any of these. Suitable amounts of thickener are in the range of from 0.005 to 0.5 wt %, preferably from 0.01 to 0.1 wt %.

In a preferred embodiment, the suspensions additionally comprise a multivalent metal ion such as calcium.

The suspension optionally comprises further ingredients. Examples of such ingredients are benefit agents such as live bacteria of the type of e.g. lactobacillus, or vitamins; stabilising agent such polyphosphate, colouring agents, flavour agents, herbs, fruit pieces, fruit pulp, herb or fruit concentrate, fruit juice, anti-oxidants, sequestering agents, salts.

The suspension may be prepared from it's ingredients such as e.g. a reconstituted milk but it is preferred that the suspension is a natural product such as a dairy milk to which the emulsifier is added.

In a preferred embodiment, the invention relates to a milk, comprising from 0.1 to 5 wt % fat, from 0.01 to 0.2 wt % monoglyceride and from 0.2 to 4 wt % phytosterolester.

The suspension may be used as such or may be part of another composition such as a food product. It is preferred that the suspension is used as such. Even more preferred the suspension is a milk or a juice, most preferred a milk.

In a further aspect the invention relates to use of an emulsifier with HLB value at or below 16 to reduce age gelation in sterilized protein containing suspensions, especially UHT treated milks.

The invention is illustrated by the following non limiting examples.

EXAMPLES

Generation
Determination of UHT/Age Gelation—Stability
Age gelation is determined by eye by a panel of at least 5 persons. The milk turns from liquid (pourable without visual lumps) to a soft gel, in some cases by the development of small lumps of protein. The age gelation is identified on basis of the following questions:
1. Is there a liquid layer on top which is greenish or less turbid than milk? (yes/no)
2. Is there inhomogeneity when pouring out the milk? (yes/no)
3. Do you see visible lumps? (yes/no)
4. Do you hear lumps falling while pouring the milk? (yes/no)
5. Is there a Tofu/custard like structure at the bottom? (yes/no)

It is important that these observation are made before shaking the product because shaking may remove the gelation.

Example 1

Carrageenan and monoglyceride (E471, Hymono™) were added to semi skimmed milk (fat content 1.5 wt % dairy fat, protein content 3.2 wt %), under agitation and mixed for 10 minutes. The amount of carrageenan was 0.01 wt % and the amount of monoglyceride was 0.1 wt % and 0.5 wt % sitosterolester of sunflower oil was added.

The milk was preheated to 70° C. and ultra high temperature treated at 143° C. for 6 seconds by steam injection, then cooled to 70° C., and homogenised at this temperature at about 200 bar. The milk was cooled to 15 to 20° C. and aseptically filled in aseptic tetrapaks™ and stored at ambient temperature (20 to 25° C.)

After 8 weeks at ambient temperature the milks were compared to milks with the same composition except that monoglyceride was left out or included at a level of only 0.001 wt %. These comparative milks were prepared by the same process.

It was observed by eye by an expert panel of 5 people that the milks with monoglycerides in an amount of 0.1 wt % did not show any age gelation after a period of 8 weeks. A few lumps became visible after 8 months. The comparative products both showed lumps and a cream layer on top after a storage time of 4 weeks. For the comparative products, especially question (1) (Is there a liquid layer on top which is greenish or less turbid than milk?) was answered in the affirmative which pointed to a less desired product.

Example 2

Products were prepared according to the process and composition of example 1. Together with the addition of carrageenan and 0.05 wt % monoglyceride, 0.7 wt % sitosterolester of sunflower oil was added.

The resulting products were found to be stable by a panel of 5 persons after storage for 8 weeks at a temperature of 20 to 25° C.

Example 3

Products were prepared according to the process and product composition of example 1 with the following modifications. In stead of monoglyceride, the emulsion comprises 0.2 wt % DATEM (diacetyl tartaric acid esters of mono-and diglycerides, HLB about 9). The amount of carrageenan was 0.015 wt %.

The resulting compositions were stable and did not show gelation on storage for 16 weeks at 5° C.

Example 4

Products were prepared according to the process and product composition of example 1 with the following modifications. In stead of monoglyceride, the emulsion comprises 0.05 wt % sucrose ester of fatty acids (Ryoto sugar ester S-1170™, HLB about 11). The amount of carrageenan was 0.015 wt %. The amount of sitosterol fatty acid ester in these products was 0.7 wt %.

The resulting compositions were stable and did not show gelation on storage for 16 weeks at 5° C.

The invention claimed is:

1. Sterilized aqueous suspension comprising 0.5 to 10% protein and from 0.1 to 8 wt % fat and optionally a fat replacer and from 0.01 wt % to 1 wt % emulsifier with a hydrophylic/lypophylic balance of at or below 16 wherein the emulsifier comprises a monoglyceride, the suspension comprising a phytosterol or ester thereof and further wherein the suspension has been sterilized at a temperature of around 110° C. or higher, the suspension having a viscosity of from 2 to 100 mPaS at a temperature of between 5 and 25° C. and a shear rate of 100 Hz.

2. Aqueous suspension according to claim 1 comprising from 1 to 10 wt % protein.

3. Aqueous suspension according to claim 1 wherein the protein is a dairy protein.

4. Aqueous suspension according to claim 1 wherein the emulsifier further includes an emulsifier selected from the group of lecithins, diglycerides, diacetyl tartaric acid esters of mono-and diglycerides, sucrose esters of fatty acids, sodium stearoyl lactylate (SSL), citric acid esters of mono- and diglycerides, or a combination thereof.

5. Aqueous suspension according to claim 1 wherein the emulsifier further includes an emulsifier selected from the group of lecithins, diglycerides or a combination thereof.

6. The sterilized aqueous suspension according to claim 1 comprising 0.005 to 0.5 wt % thickener.

7. The sterilized aqueous suspension according to claim 1 which does not show any age gelation after 8 weeks storage at 20 to 25° C.

8. Aqueous suspension according to claim 1 wherein the amount of emulsifier is from 0.05 to 0.2 wt %.

9. The aqueous suspension according to claim 1 wherein the level of fat in the aqueous suspension is from 1 to 5 wt %.

10. The aqueous suspension according to claim 1 wherein the suspension has been sterilized at a temperature of over 120° C.

11. The aqueous suspension according to claim 1 comprising from 0.2 to 4 wt % phytosterol ester.

12. The suspension according to claim 1 wherein the monoglyceride has an HLB of 1 to 6.

13. The suspension according to claim 1 wherein the emulsifier consists of monoglyceride.

* * * * *